United States Patent
Gillis et al.

(10) Patent No.: US 10,189,390 B2
(45) Date of Patent: Jan. 29, 2019

(54) SPLIT WING ARMREST DUAL PAWL LATCH MECHANSIM

(71) Applicant: Ford Global Technologies, LLC, Dearborn, MI (US)

(72) Inventors: Francis Raymond Gillis, Farmington Hills, MI (US); Ian Johns, Woodhaven, MI (US); Francesco DiDato, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 350 days.

(21) Appl. No.: 15/087,078

(22) Filed: Mar. 31, 2016

(65) Prior Publication Data

US 2017/0282761 A1 Oct. 5, 2017

(51) Int. Cl.
*B60N 2/75* (2018.01)

(52) U.S. Cl.
CPC .................... *B60N 2/793* (2018.02)

(58) Field of Classification Search
CPC ..................................................... B60N 2/793
USPC ........... 297/188.14–188.19; 296/24.37, 37.8; 248/311.2
See application file for complete search history.

(56) References Cited

U.S. PATENT DOCUMENTS

| 5,505,516 A * | 4/1996 | Spykernnan | B60N 3/102 248/311.2 |
| 5,524,958 A * | 6/1996 | Wieczorek | A47C 7/70 297/188.17 |
| 5,749,629 A | 5/1998 | Heath et al. | |
| 6,409,136 B1 * | 6/2002 | Weiss | B60N 3/102 224/926 |
| 8,167,348 B2 | 5/2012 | Fesenmyer | |
| 8,215,688 B2 | 7/2012 | Hipshier et al. | |
| 8,573,552 B2 * | 11/2013 | Andersson | B60N 3/10 248/311.2 |
| 2009/0095764 A1 * | 4/2009 | Schaal | B60N 3/101 220/737 |
| 2017/0334325 A1 * | 11/2017 | Ramaer | B60N 2/793 |

FOREIGN PATENT DOCUMENTS

| DE | 102013001789 A1 * | 8/2014 | B60R 7/04 |
| DE | 102017111025 A1 * | 11/2017 | B60R 7/04 |
| EP | 0587014 A2 | 3/1994 | |
| FR | 2877615 A1 * | 5/2006 | B60R 7/04 |
| WO | 2008142116 A1 | 11/2008 | |

* cited by examiner

Primary Examiner — Syed A Islam
(74) Attorney, Agent, or Firm — Vichit Chea; Brooks Kushman, P.C.

(57) ABSTRACT

A latch assembly for a vehicle armrest may include a pair of pawls fixed on opposite sides of a coupler, each pawl including a projection on each end thereof, and a pair of paddles each engaging one of each pawls and configured to cause inward translation of at least one of the pawls in response to an actuation at one of the paddles, wherein an inward translation of one pawl causes, via the coupler, an inward translation of the other pawl to disengage the projections from a console.

18 Claims, 11 Drawing Sheets

SPLIT WING ARMREST DUAL PAWL LATCH MECHANSIM

TECHNICAL FIELD

Disclosed herein are dual pawl latch mechanism assemblies.

BACKGROUND

Vehicles often include center console arranged between driver and passenger seats. The console may include an arm rest that may be adjustable to a user's preferences. Such arm rests may be moveable in a fore and aft direction in order to permit access to compartments within the console. The arm rests may also be pivotable about an axis and may be opened to store items therein.

SUMMARY

A latch assembly for a vehicle armrest may include a pair of pawls fixed on opposite sides of a coupler, each pawl including a projection on each end thereof, and a pair of paddles each engaging one of each pawls and configured to cause inward translation of at least one of the pawls in response to an actuation at one of the paddles, wherein an inward translation of one pawl causes, via the coupler, an inward translation of the other pawl to disengage the projections from a console.

An armrest assembly for a vehicle armrest may include a pair of armrests spaced from one another and arranged on each side of a center console, each armrests including a pawl fixed to opposite sides of a coupler, and a pair of paddles each engaging one pawl and configured to cause, via the coupler, an inward translation of both pawls in response to an actuation at one of the paddles.

A pawl assembly for a vehicle armrest may include a pair of pawls coupled to each side of a coupler, a pair of paddles each engaging one of the pawls, the paddles rotatable about a pivot such that an actuation at one of the paddles is configured to cause an inward translation of a respective pawl and wherein the inward translation of the respective pawl causes, via the coupler, an inward translation of the other pawl.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles often include center consoles between the driver and passenger seats. These consoles may provide for storage, as well as provide armrests integrated into a storage bin lid to increase driver and passenger comfort and provide a cover for the storage bin. These armrests may include a single armrest lid and a latch mechanism arranged in the center thereof. Upon actuation of a latch, an armrest lid may rotate about a pivot, allowing a user access to a storage compartment below the armrest. In some situations, dual armrests integrated into a single lid may be provided where each the driver and the passenger may enjoy their own armrest provided by the center console. One example console may include a "split wing" armrest where a left and right armrest are provided with a center panel which is flush with the fore/aft panels of the console. The armrest lid may be elevated with respect to a center panel. The armrests and center panel there between may be elevated to allow a user access to the storage compartment there below.

In the split wing arrangement, the latch mechanism that is configured to release the armrest assembly from the console may be arranged within the armrest assembly to facilitate the flush panel between and below the armrest. That is, the latch mechanism may not be arranged between the two armrests, but within and below the armrests. This latch mechanism may provide for rotational actuation paddles in each of the armrests that actuate the latch mechanism independent of each other. Upon actuation of either paddle, the armrest assembly may disengage from the console such that the armrest may be pivotable with respect to the access in order to allow access to the storage compartment in an unattached state.

Figure 1:
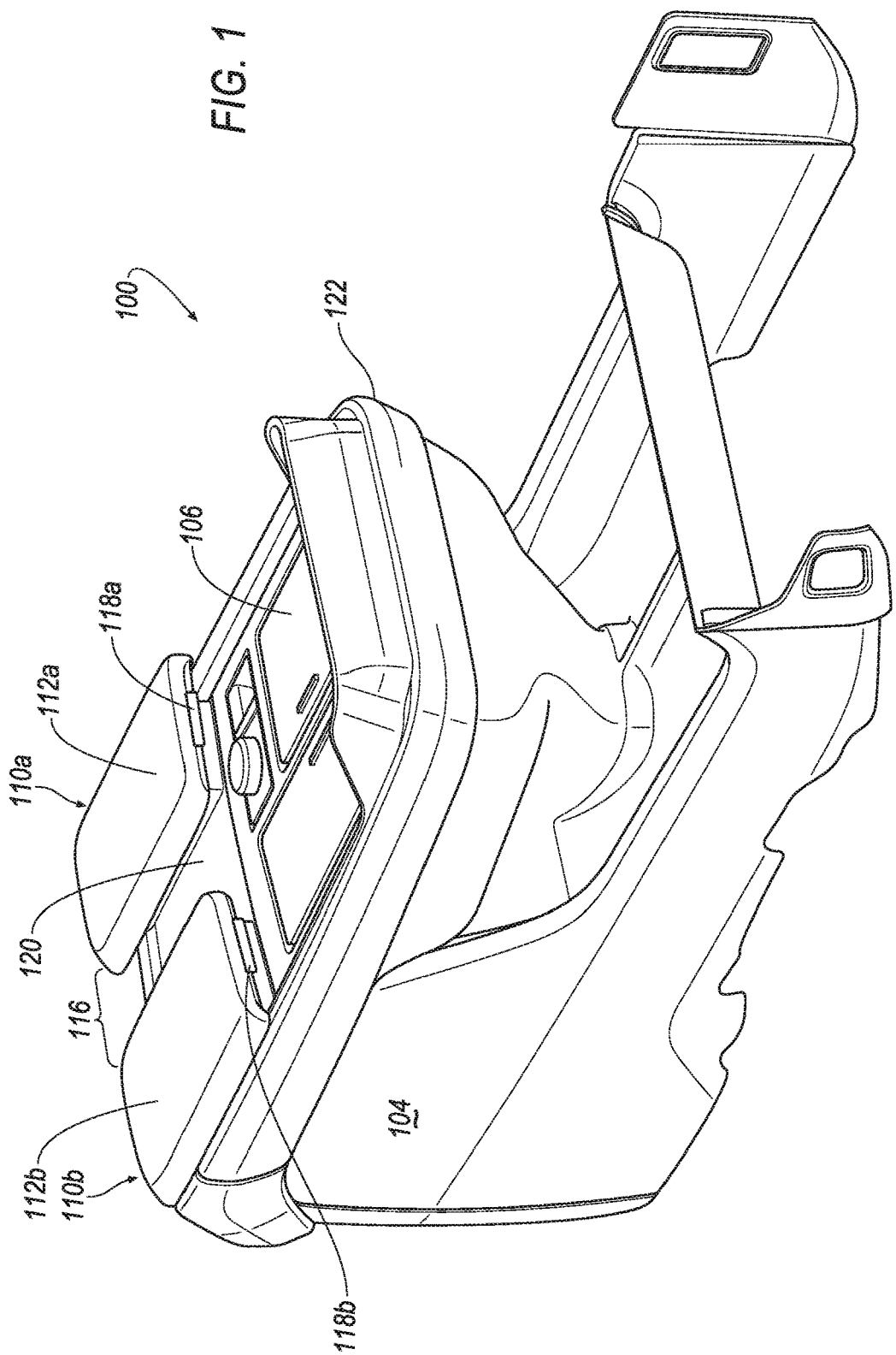
FIG. 1 illustrates a perspective view of a center console.
Figure 3:
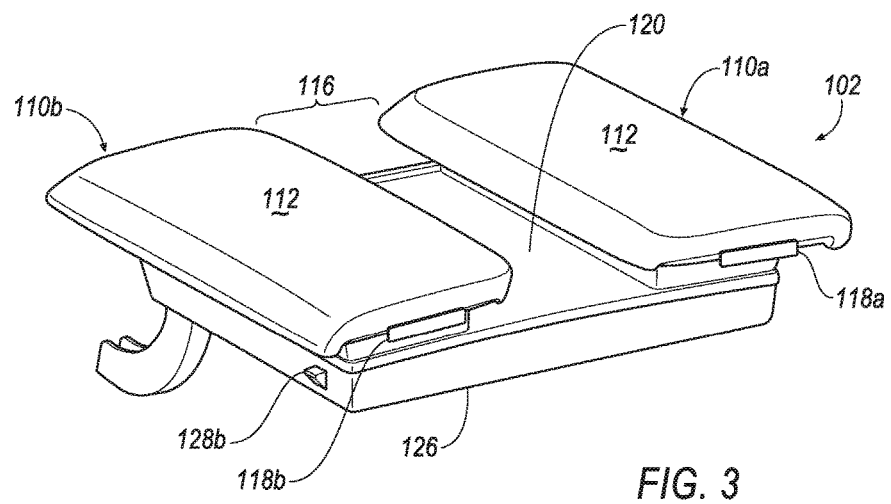
FIG. 3 illustrates a perspective view of an armrest assembly of FIG. 1.
Figure 4:
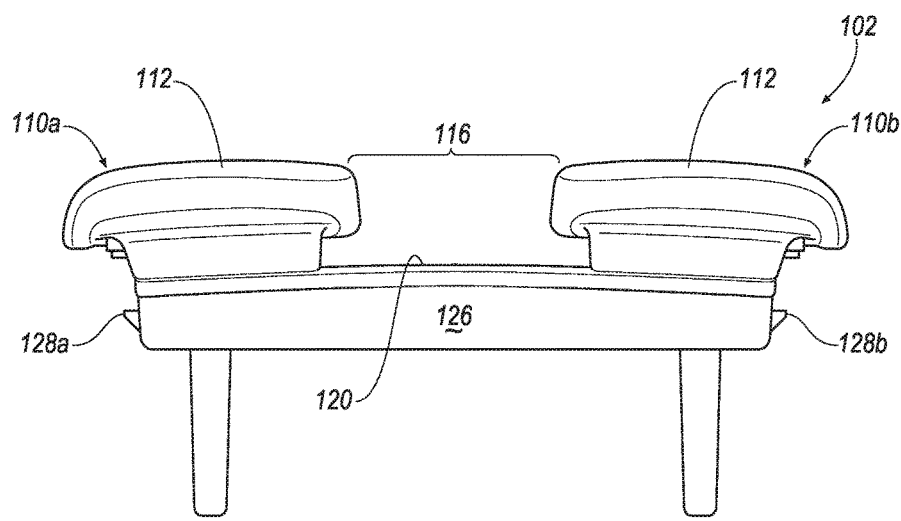
FIG. 4 illustrates a rear view of an armrest assembly of FIG. 1.

FIG. 1 illustrates a perspective view of a center console 100. The center console 100 may be arranged within a vehicle. In the example of a motor vehicle such as a car, the console 100 may be arranged between a driver's seat and a passenger's seat. The console 100 may also be arranged between two rear seats. The console 100 may be configured to provide for closed storage within the vehicle and may include at least one storage receptacle 104. The center console 100 may include an armrest assembly 102 (as best shown in FIGS. 3 and 4). The armrest assembly may include at least two armrests 110a, 110b, collectively referred to herein as armrests 110. The armrests 110 may each include a top portion 112a, 112b, collectively referred to herein as top portions 112. In one example, the top portions 112 may be configured to actuate about an axis such that the top portions 112 may open and close to gain access to an interior 114a, 114b of the respective armrest 110, collectively referred to herein as interiors 114.

The armrests 110 may define a space 116 between one another and may be elevated from the console 100. The space 116 may provide unobstructed access to a panel 230 arranged on the console 100 between the armrests 110. The panel 120 may be flush with the doors 106 and/or a fore portion 122 of the console 100. The armrests 110 may form a split wing assembly such that the armrests 110 are raised above a flush center panel (e.g., panel 120).

The armrest assembly 102 may be pivotable about the console 100 and in an open state, may allow access to the storage receptacle 104. The armrests 110 may each include at least one release mechanism 118a, 118b, collectively referred to herein as release mechanism 118. Upon actuating one of the release mechanisms 118, the armrest assembly 102 may be released from a locked position from the console 100 and may be movable about a pivot, thus providing access to the storage receptacle 104 within the console 100. The release mechanism 118 is described in more detail below with respect to FIG. 10.

Figure 2:
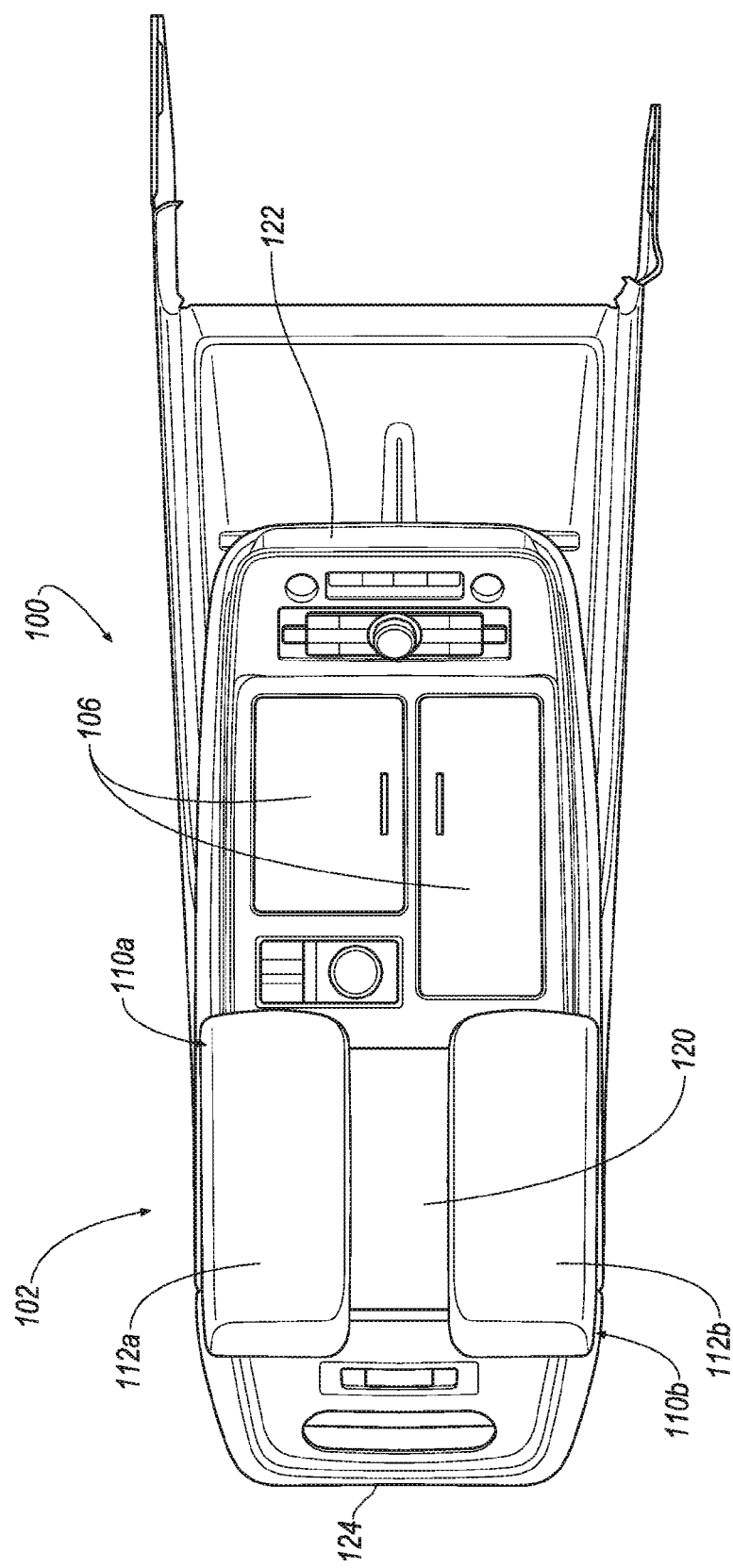
FIG. 2 illustrates a top view of the console of FIG. 1.

FIG. 2 illustrates a top view of the console 100 of FIG. 1. As explained above, a pair of elevated armrests 110 may be spaced from one another. The panel 120 may be arranged within the space 116 and may be flush with the fore and aft portions 122, 124 of the console 100. One or more doors 106 may be arranged within the console 100 to provide access to the receptacle 104.

FIG. 3 illustrates a perspective view of the armrest assembly 102 of FIG. 1. FIG. 4 illustrates a rear view of the armrest assembly of FIG. 1. The portion of the console just below the panel 120 is referred to herein as the panel housing 126. The panel housing 126 may be arranged just below the armrests 110.

The armrest assembly 102 may include a pawl projection 128a, 128b, collectively referred to as pawl projections 128, at each side of the armrest assembly 102. The pawl projections 128 may retract into the armrest assembly in response to an actuation at one of the release mechanisms 118. Retraction of the pawl projections 128 may release the armrest assembly 102 from a locked position with the console 100. This is described in more detail below with respect to FIG. 10.

Figure 5:
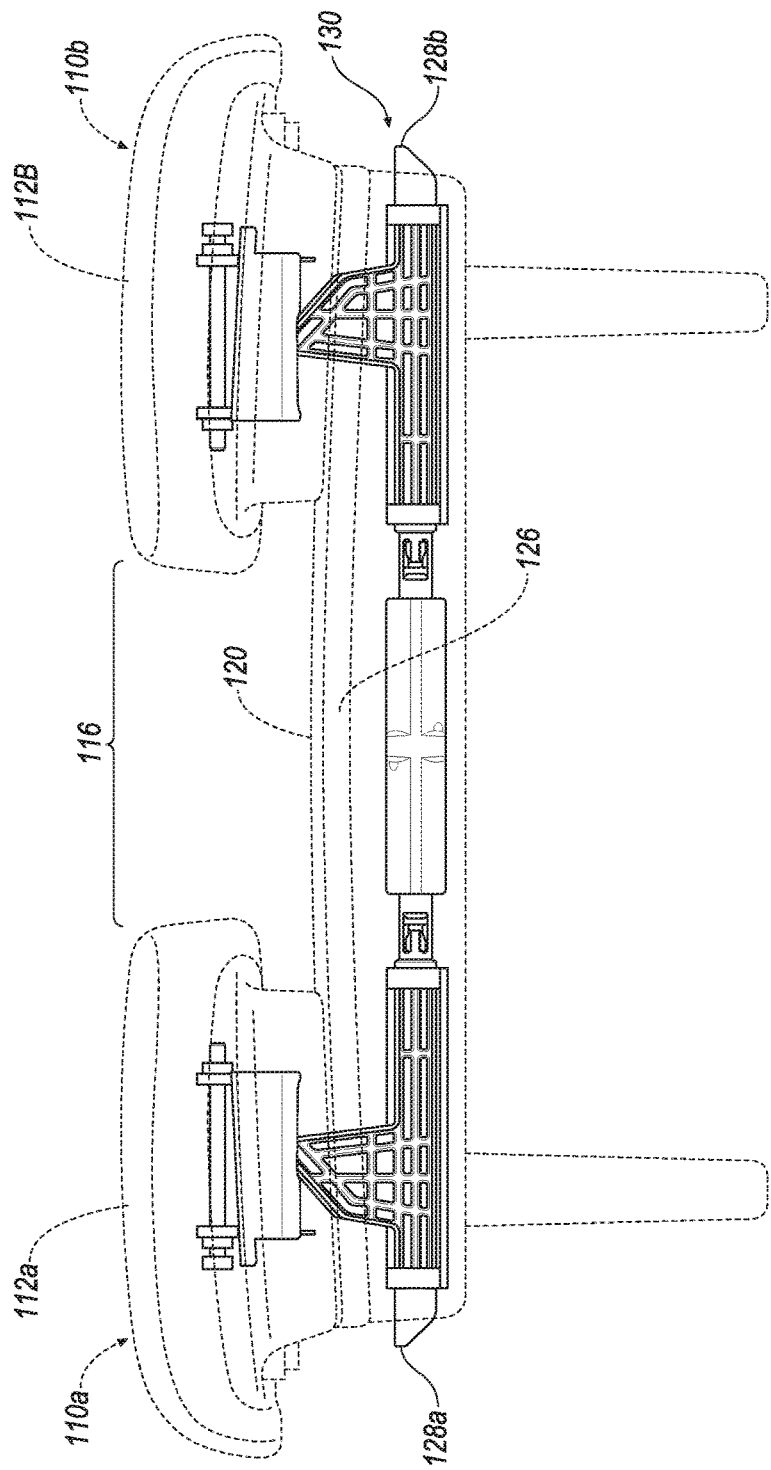
FIG. 5 illustrates a cross-sectional view of the portion of the console of FIG. 4.

FIG. 5 illustrates a cross-sectional view of the panel housing 126 of the console 100 of FIG. 4. The panel housing 126 may house a latch assembly 130. The latch assembly 130 may be configured to maintain the top portion 112 of the armrests 110 in a closed position. The latch assembly 130 may include the pawl projections 128.

Figure 6:
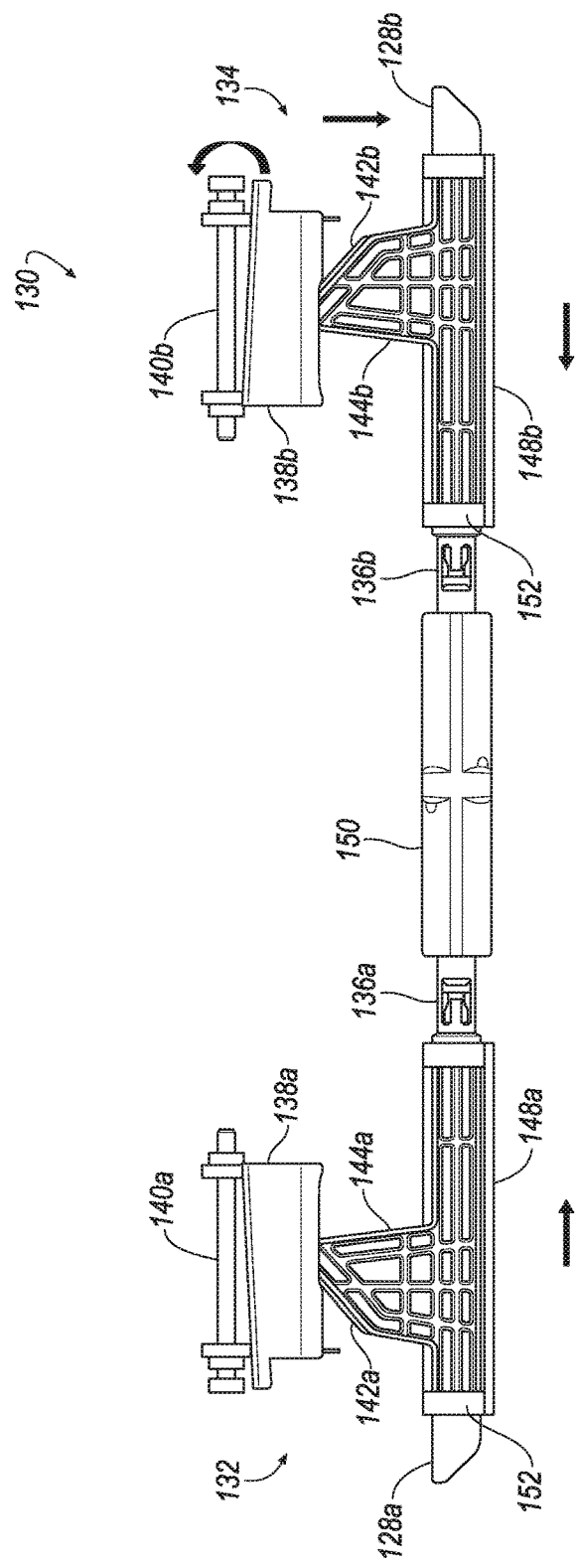
FIG. 6 illustrates a cross-sectional view of a latch assembly.

FIG. 6 illustrates a cross-sectional view of the latch assembly 130. The latch assembly 130 may include a first portion 132 arranged within the first armrest 110a and a second portion 134 arranged within the second armrest 110b. The first portion 132 may include a first latch paddle 138a and a first latch pivot 140a arranged there through. The paddle 138a may be arranged within the armrest 110a and may be configured to actuate, or rotate, about the pivot 140a.

The paddle 138a may be coupled to a first shaft 144a of a first pawl 148a via a cam surface. As the first paddle 138a is rotated about the first pivot 140a, the first paddle 138a may cause the shaft 144a to move linearly downward, as shown in FIG. 6. That is, the rotational motion of the first paddle 138 may cause linear displacement of the first shaft 144a. This is in part due to the paddle 138a being splined to the shaft.

Once the first shaft 144a is displaced, the first pawl 148a may subsequently translate inward in response to the linear vertical translations of the first shaft 144a. Because the first pawl 148a is splined to the first shaft 144a, the first pawl 148a remains horizontal during rotation. Thus, rotation of the first paddle 138a translates to a horizontal displacement of the first pawl 148a.

The second portion 134 may include corresponding parts to the first portion 132. For example, the second portion 134 may include a second latch paddle 138B, a second latch pivot 140b, a second shaft 144b and a second pawl 148b. The parts may be referred to collectively as paddles 138, pivots 140, shafts 144 and pawls 148.

The first pawl 148a and second pawl 148b may be connected and attached to a coupler 150. The coupler 150 may be a cylindrical coupler arranged between the pawls 148 within a center of the panel housing 126. The coupler 150 may interface with each of the pawls 148 such that each of the pawls 148 are hard coupled to the coupler 150 at first and second attachment jaws 136A, 136B, collectively referred to herein as attachment jaws 136. Each of the attachment jaws 136 may be retractable within the coupler 150. The coupler 150 may include a gear mechanism therein (not shown) configured to couple to each of the jaws 136. The gear mechanism may include a pair of gears coupled together and each connected to one of the jaws 136.

The gear mechanism may facilitate mirror reactions at each of the jaws 136. For example, if one of the jaws 136 moves inward, the gear mechanism will pull the other jaw 136 inward as well. For example, as one pawl 148 is translated horizontally inward in response to an actuation at a respective paddle 138, the coupler 150 may also pull the opposite pawl 148 inward. That is, if the first pawl 148a is translated horizontally inward, so is the second pawl 148b. Thus, the pawls 148 are configured to act as both master and slave relative to one another. For example, when the first paddle 138a is actuated, the first paddle 138a is configured to act as the master and the second paddle 138B is configured to act as the salve and vice versa.

As the pawls 148 are moved inward, so are the pawl projections 128. As the pawl projections 128 move inward, the armrest assembly 102 is released from the locked position with respect to the console. Thus, actuation at one paddle 138 may cause each of the pawl projections 128 to recede within the panel housing 126, releasing the armrest assembly 102.

Figure 7:
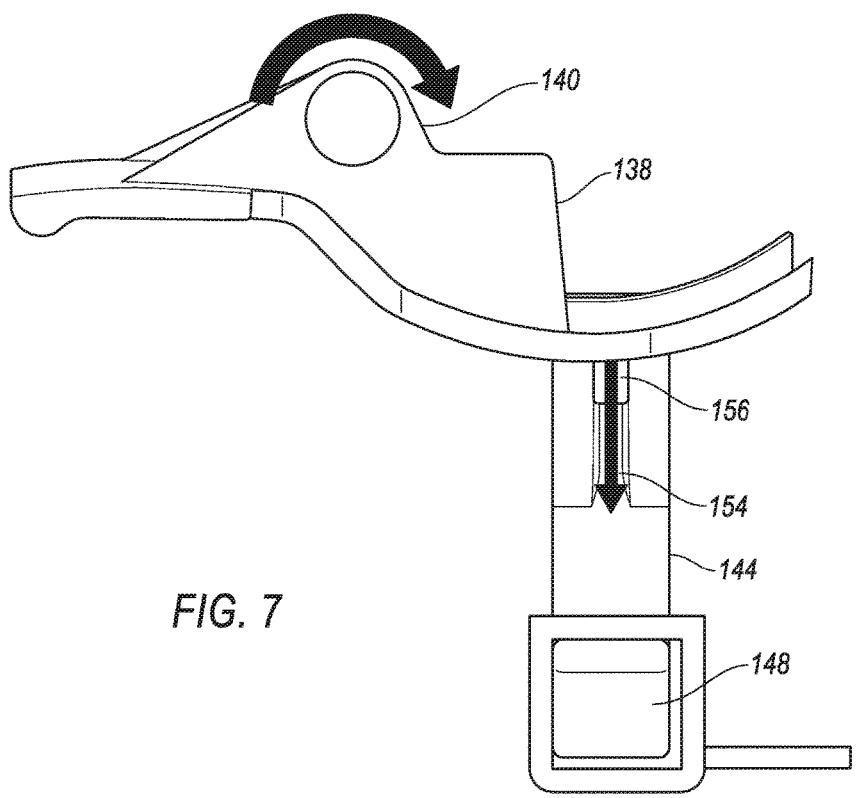
FIG. 7 illustrates a side view of a portion of the latch assembly of FIG. 6.

FIG. 7 illustrates a side view of a portion of the latch assembly 130 of FIG. 6. Each shaft 144 may include an angular slope 142a, 142b, collectively referred to herein as angular slope 142, as best shown in FIG. 6. The angular slope 142 may define a spline 152 or follower 152. Furthermore, the paddle 138 may include a paddle projection 156 or paddle cam 156 configured to engage the spline 152. The cam 156 may be received by the follower 152 such that the cam 156 is maintained and slidable within a track created by the follower 152. As the paddle 138 is rotated downward, the projection 156 may slide within the spline 152. The paddle projection 156 may maintain a lateral position during the downward rotation. In doing so, as the projection 156 moves laterally downward within the spline 152, the pawl 148 may be forced inward toward the coupler 150.

That is, as the paddle 138 rotates downward, the projection 156 is pushed further down within the spline 154. The shaft 144 may thus move inward as the projection 156 moves downward to accommodate the downward motion of the projection. The angular slope 142 housing the spline 154 guides the pawl 148 inward. Thus, the shaft 144 of the pawl 148 moves inward in response to actuation of the paddle 138.

Figure 8A:
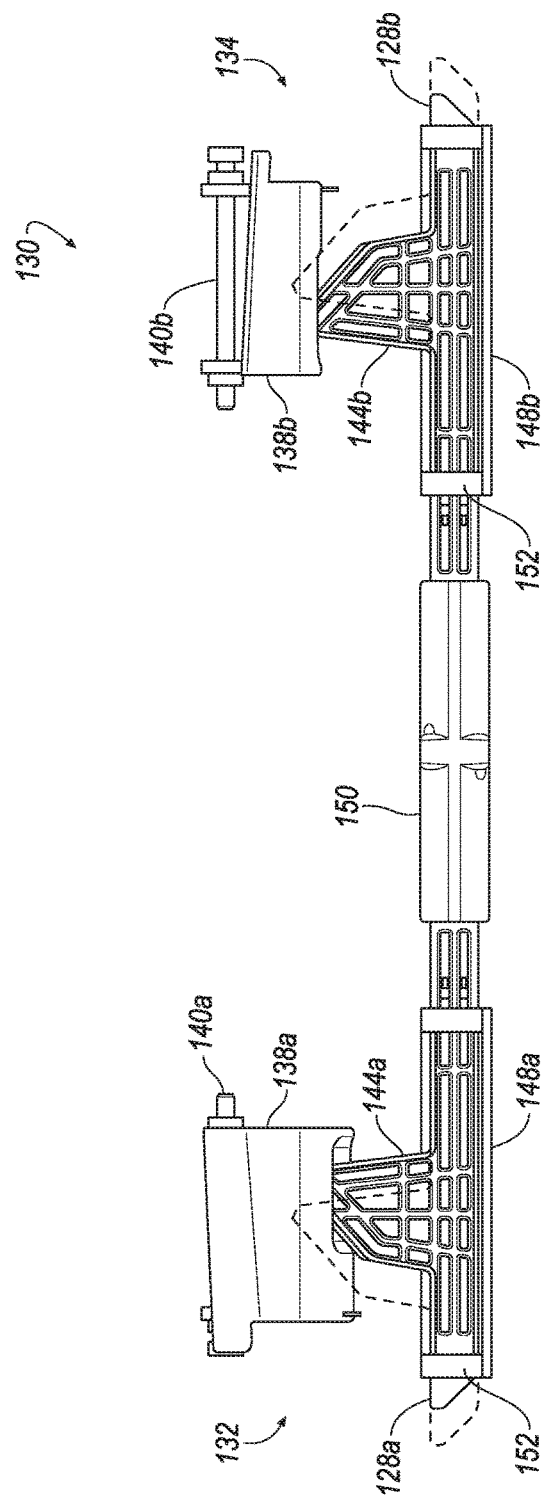
FIGS. 8A-8B illustrate cross-sectional views of the latch assembly of FIG. 6 in various states.
Figure 8B:
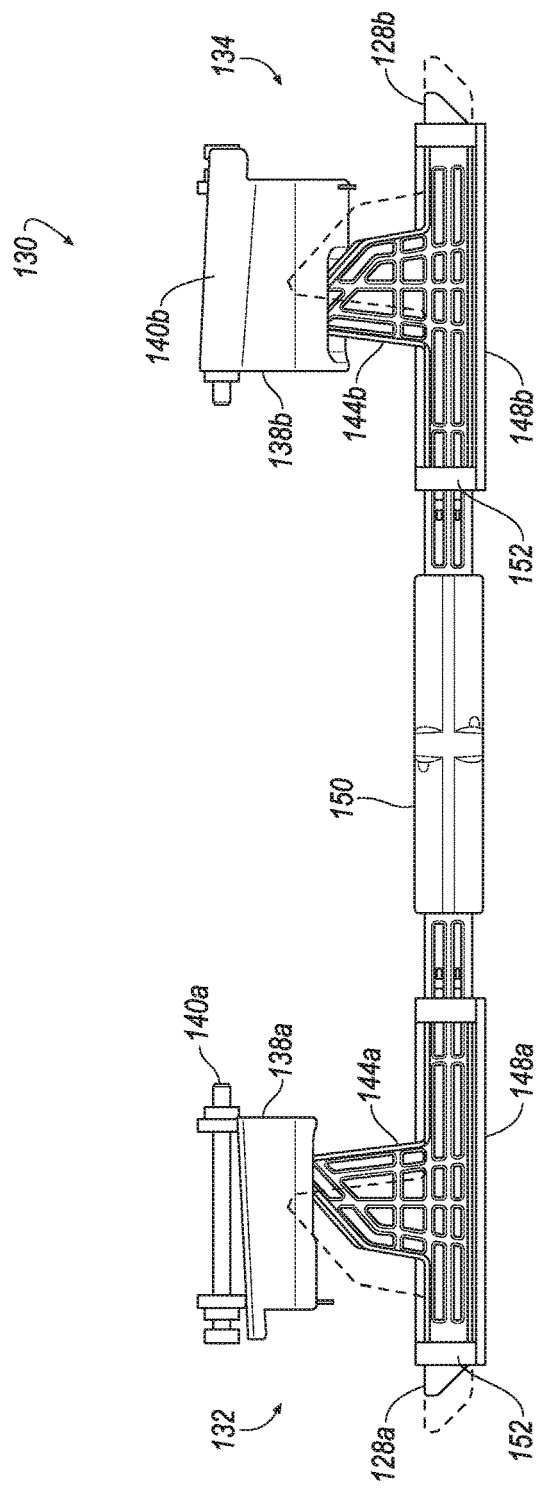

FIGS. 8A-8B illustrate cross-sectional views of the latch assembly 130 of FIG. 6 in an actuated or released state. FIG.

6, as described above, illustrates the latch assembly 130 in a normal nominal position or latched state. In the normal position, the pawl projections 128 may be biased outward and the armrest assembly 102 may be in a locked position with respect to the console 100.

FIG. 8A illustrates the latch assembly 130 in an actuated position where the first paddle 138a is actuated. In response to the first paddle 138a being actuated, the first pawl 148a is translated inward toward the coupler 150. Subsequently, due to the dual-pawl assembly and the coupler 150, the second pawl 148b is also translated inward toward the coupler 150. Both pawl projections 128 are pulled inward with the pawls 148 to release the armrest assembly 102 from the console 100.

FIG. 8B illustrates the latch assembly 130 in an actuated position where the second paddle 138b is actuated. In response to the second paddle 138b being actuated, the second pawl 148b is translated inward toward the coupler 150. Subsequently, due to the dual-pawl assembly, the first pawl 148a is also translated inward toward the coupler 150.

Figure 9A:
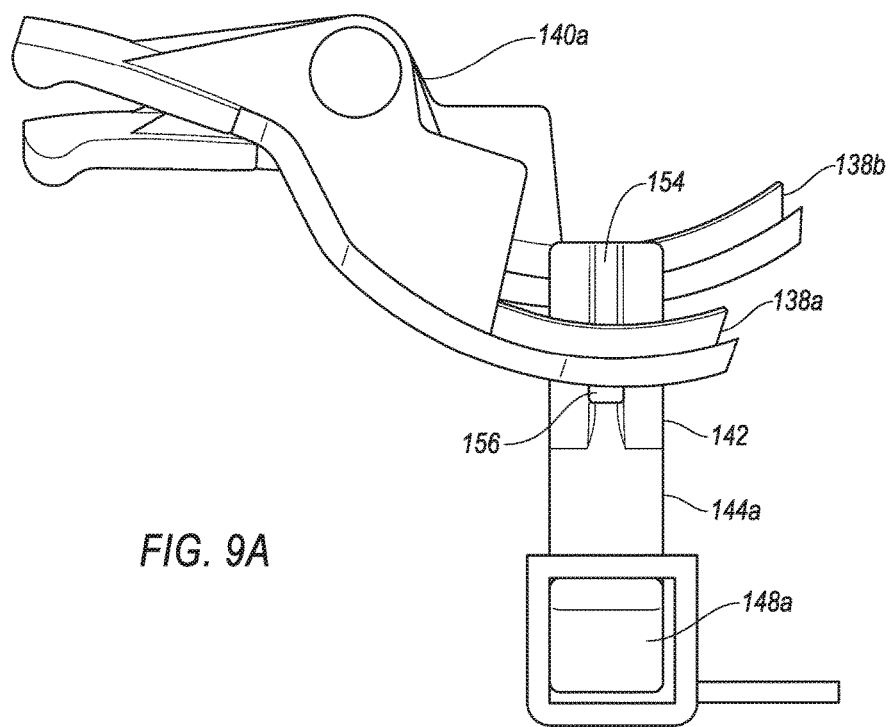
FIGS. 9A and 9B illustrate side views of the portion of the latch assembly of FIG. 6.
Figure 9B:
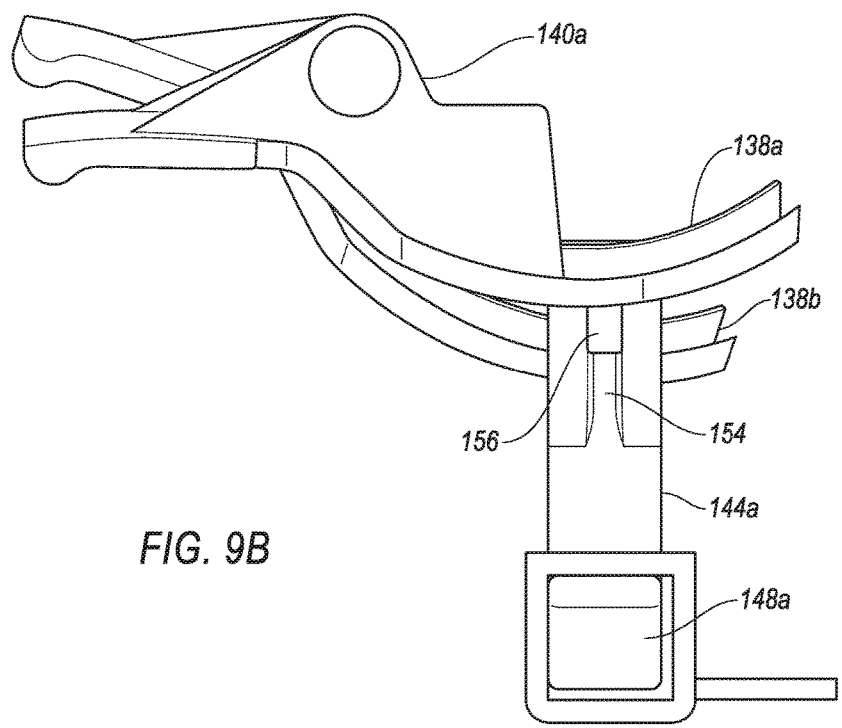

FIGS. 9A and 9B illustrate side views of the portion of the latch assembly 130 of FIG. 6 in the actuated states. FIG. 9A illustrates the first paddle 138a being actuated and FIG. 9B illustrates the second paddle 138b being actuated.

Further shown in FIGS. 9A and 9B is the spline 154 defined within the shaft 144 for receiving the paddle projection 156.

Figure 10:
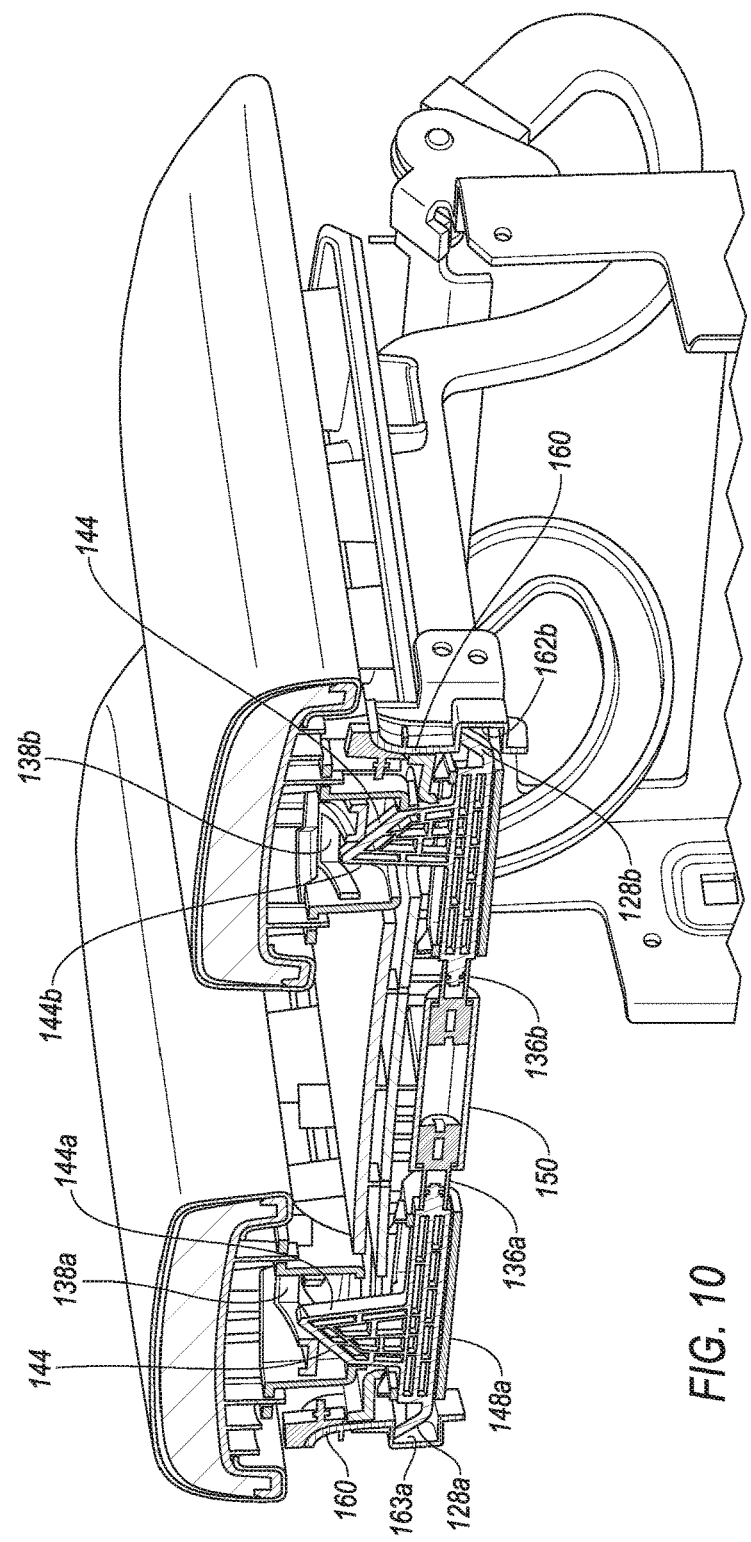
FIG. 10 illustrates a perspective cross-sectional view of the armrest assembly of FIG. 1.

FIG. 10 illustrates a perspective cross-sectional view of the armrest assembly 102. As shown, the latch assembly 130 may be included within the armrest assembly 102. The console 100 may include a frame 160 defining a recess 162a, 162b at each side of the armrest assembly, collectively referred to herein as recesses 162. During the locked state, the recess 162 may be configured to receive the pawl projections 128 and maintain the armrest assembly 102 on the console 100. In the released state, the pawl projections 128 may be pulled inward and therefor removed from the recesses 162, allowing the armrest assembly 102 to be released from the console 100.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A latch assembly for a vehicle armrest, comprising:
a pair of pawls fixed on opposite sides of a coupler, each pawl including a projection on each end thereof, and
a pair of paddles each engaging one of each pawls and configured to cause inward translation of at least one of the pawls in response to an actuation at one of the paddles, wherein an inward translation of one pawl causes, via the coupler, an inward translation of the other pawl to disengage the projections from a console.

2. The latch assembly of claim 1, wherein each of the pawls includes a shaft portion having an angular slope, the angular slope defining a follower.

3. The latch assembly of claim 2, wherein the paddle includes a paddle cam configured to be received by the follower and slidable therein.

4. The latch assembly of claim 3, wherein an actuation at the paddle is configured to cause the paddle cam to slide laterally downward within the follower forcing the pawl to move inward as the paddle cam slides down the angular slope.

5. The latch assembly of claim 1, wherein each paddle is rotatable about a pivot within an armrest.

6. The latch assembly of claim 1, wherein each paddle is arranged within one of a pair of armrests, the armrests being spaced from one another.

7. The latch assembly of claim 1, wherein the latch assembly is configured to disengage an armrest assembly from a closed position with respect to the console to permit access to a compartment therein.

8. An armrest assembly for a vehicle armrest, comprising:
a pair of armrests spaced from one another and arranged on each side of a center console, each armrests including a pawl fixed to opposite sides of a coupler, wherein each pawl includes at least one projection on each end thereof and a shaft portion having an angular slope defining a follower, and
a pair of paddles each engaging one pawl and configured to cause, via the coupler, an inward translation of both pawls in response to an actuation at one of the paddles.

9. The armrest assembly of claim 8, wherein the console is configured to engage the projection in an attached state.

10. The armrest assembly of claim 9, wherein the projection is configured to disengage the console in response to the lateral translation of the pawls.

11. The armrest assembly of claim 8, wherein the follower is configured to receive a paddle cam arranged on the paddle.

12. The armrest assembly of claim 11, wherein an actuation at the paddle is configured to cause the paddle cam to slide laterally downward within the follower forcing the pawl to move inward as the paddle cam slides down the angular slope.

13. The armrest assembly of claim 12, further comprising at least one release mechanism configured to actuate the paddle.

14. A pawl assembly for a vehicle armrest, comprising:
a pair of pawls coupled to each side of a coupler, and
a pair of paddles each engaging one of the pawls, the paddles rotatable about a pivot such that an actuation at one of the paddles is configured to cause an inward translation of a respective pawl and wherein the inward translation of the respective pawl causes, via the coupler, an inward translation of the other pawl, wherein the paddle includes a paddle cam configured to be received by a follower on a shaft of each pawl.

15. The pawl assembly of claim 14, wherein the paddle cam is configured to slide laterally downward the follower in response to actuation of the paddle.

16. The pawl assembly of claim 15, wherein the lateral translation of the paddle cam is configured to translate to an inward translation of the pawl with respect to the coupler.

17. The pawl assembly of claim 16, wherein the coupler is configured to, in response to an inward translation of the pawl, cause an inward translation of the other pawl.

18. A vehicle armrest assembly, comprising:
a pair of armrests spaced from one another and arranged on each side of a center console and including at least one projection on each end thereof and wherein the console is configured to engage the projection in an attached state;
a pair of paddles each engaging one pawl and configured to cause, an inward translation of both pawls in response to an actuation at one of the paddles.

* * * * *